United States Patent [19]

Happy

[11] 3,771,894
[45] Nov. 13, 1973

[54] CIRCULAR ARC GROOVE CUTTING MACHINE

[75] Inventor: Raymond Happy, Wayne, Mich.

[73] Assignee: General Motors Corporation, Detroit, Mich.

[22] Filed: Sept. 25, 1972

[21] Appl. No.: 291,783

[52] U.S. Cl............................ 408/54, 90/30, 90/78
[51] Int. Cl............................................. B23b 39/28
[58] Field of Search....................... 90/30, 31, 78; 408/54; 29/95.1

[56] References Cited
UNITED STATES PATENTS
3,143,923  8/1964  Krzyszczuk....................... 408/54 X
2,640,398  6/1953  Manning............................. 90/31 X Primary Examiner—Leonidas Vlachos
Attorney—J. L. Carpenter et al.

[57] ABSTRACT

A groove cutting machine for cutting a circular arc groove of constant depth between two apertures in a workpiece has a rotary tool head rotatable about the center line of the circular arc groove to be cut carrying a plurality of relatively movable teeth which are guided by a stationary cam to successively extend while traversing one of the apertures in the workpiece from a retracted position clear of the workpiece to a cutting position that is maintained through a circular arc as long as the groove to be cut with the teeth having progressively larger cutting depth so that they provide progressively deeper cuts in the workpiece and then to successively retract as they traverse the other aperture to their retracted positions all in less than one complete tool head revolution.

3 Claims, 5 Drawing Figures

CIRCULAR ARC GROOVE CUTTING MACHINE

This invention relates to circular arc groove cutting machines and more particularly to circular arc groove cutting machines for cutting a circular arc groove of constant depth between two apertures without extending therepast.

In the machining of circular arc grooves such as the side seal grooves in the rotor of a rotary engine of the Wankel type wherein each of these grooves extends between two corner seal apertures and have a high depth-to-width ratio and a very smooth side wall finish requirement, it has been found that cylindrical end milling cutters are not sufficiently rigid for the high dept-to-width ratio and on the other hand, conventional flat circular milling cutters cannot meet the specifications because of overcutting of the groove and are limited in diameter to avoid extensions of the grooves past the corner seal apertures since such extensions are potential leakage paths. One solution to this machining problem has been offered by a new circular milling cutter disclosed in copending US Pat. application Ser. No. 216,212, filed Jan. 7, 1972, entitled "Milling Cutter," and assigned to the assignee of this invention. The present invention provides another solution to this problem of cutting circular arc grooves which have a high depth-to-width ratio and a very smooth side wall finish requirement with a broach-like type of tool as distinguished from milling cutters or saws.

The groove cutting machine according to the present invention is operable to cut a circular arc groove of constant depth extending between two apertures in a workpiece by means of a tool head which is rotatable about an axis coincident with the center line of the circular arc groove to be cut. A plurality of relatively movable cutting teeth are carried on the tool head and there are provided means on the tool head for locating these teeth to cut in a tangential direction at radii from the axis equal to the radii of the groove to be cut and also for guiding movement of these teeth in directions parallel to the axis toward and away from the workpiece. Each of the teeth have a cam follower which follows a stationary circular cam track centered on the tool head axis. The cam track has a profile such that the cutting teeth are maintained in cutting positions throughout a circular arc the length of the groove to be cut and are maintained in retracted positions clear of the workpiece throughout the remaining circular arc between the two apertures. Furthermore, the cam track profile is such that it causes extension and retraction of the cutting teeth between their retracted and cutting positions as they traverse the apertures in the workpiece. The teeth have a progressively increasing cutting depth in the direction opposite the direction of tool head turning measured parallel to the axis from a fixed reference when the teeth are in their cutting positions whereby a circular arc groove of constant depth equal to the largest cutting depth of the teeth is cut between the two apertures in the workpiece by the teeth being successively extended to their cutting positions as they traverse one of the apertures and thereafter taking progressively deeper cuts in the workpiece and then being retracted to their retracted positions as they traverse the other aperture all within less than one complete tool head revolution.

An object of the present invention is to provide a new and improved cutting machine for cutting circular arc grooves.

Another object is to provide a new and improved groove cutting machine for cutting a circular arc groove of constant depth between but not extending past two apertures in a workpiece.

Another object is to provide a groove cutting machine having a rotary tool head carrying a plurality of relatively movable teeth that are moved by engagement with a stationary cam to cut a circular arc groove of constant depth between but not extending past two apertures in a workpiece.

Another object is to provide a groove cutting machine having a rotary tool head carrying a plurality of relatively movable teeth that are operated by a stationary cam to successively extend from a retracted position clear of a workpiece to a cutting position as they traverse one aperture in the workpiece and thereafter take progressively deeper cuts at a constant radius to another aperture and are then withdrawn while they traverse the latter aperture to their retracted positions whereby a circular arc groove of constant depth is cut between but does not extend past the two apertures in the workpiece.

These and other objects of the present invention will be more apparent from the following description and drawing in which.

Figure 1:
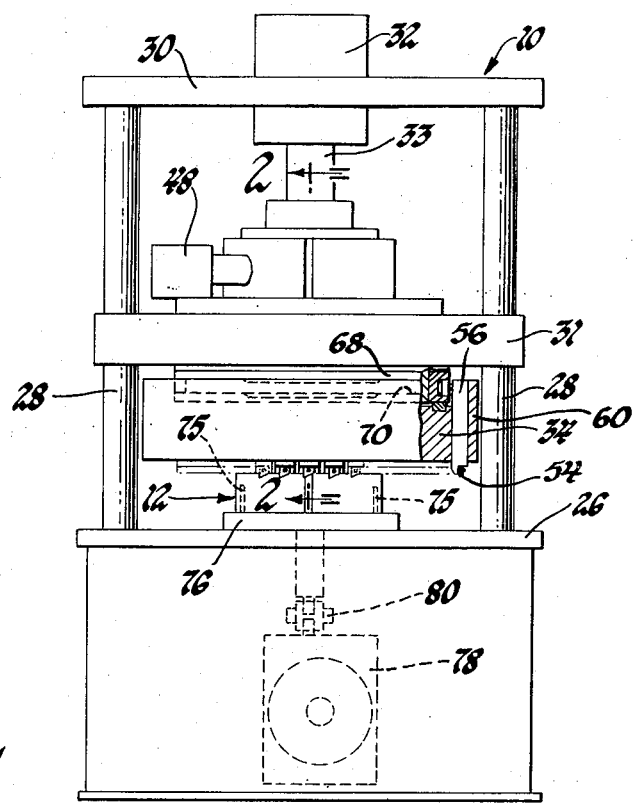
FIG. 1 is a rear elevational view of a circular arc groove cutting machine constructed according to the present invention with a rotor workpiece loaded therein.
Figure 5:
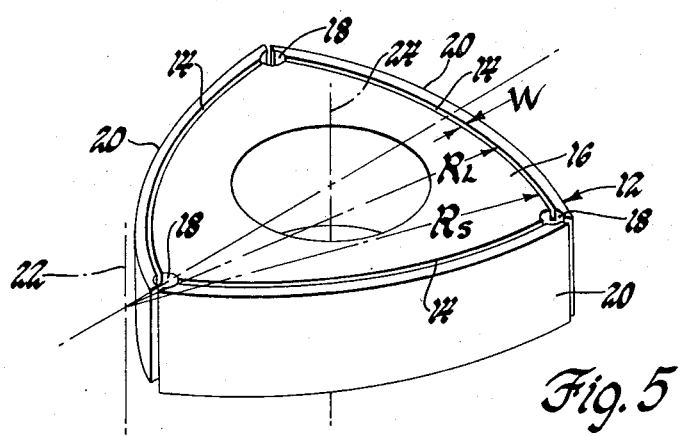
FIG. 5 is a perspective view of the rotor workpiece.

Referring to FIG. 1, there is shown a groove cutting machine generally designated as 10 constructed according to the present invention that is particuarly suited for working on the Wankel type internal combustion engine rotor 12 shown in FIG. 5 to cut the side seal grooves 14 that are on each flat side 16 of the generally triangularly shaped rotor and extend at constant depth between and not beyond the corner seal appertures 18. Typically, thse side seal grooves 14 are adjacent and extend parallel to the respective rotor faces 20 with each of the side seal grooves 14 and adjacent rotor face 20 being circular arcs whose common center line 22 is parallel to the rotors axis 24 and lies on a plane intersecting the rotor axis and the center of the corner seal aperture 18 opposite the respective side seal groove and rotor face. Such side seal grooves 14 whose inner and outer walls have small and large radii $R_S$ and $R_L$ defining a groove width W and whose bottoms have a constant depth D normally have a high width-to-depth ratio (W/D) and very smooth wall finish requirements. For example, in one practical structure the groove W is 0.04 inches and the groove depth D is 0.170 inches giving a W/D ratio of approximately 4:1 and the wall finish is set at better than 30 micro inches.

The groove cutting machine 10 generally comprises a table 26 to which a pair of vertical columns 28 are rigidly secured at their lower ends. The upper ends of the columns 28 are rigidly secured to an overhead plate 30. A tool head support 31 is mounted on the columns 28 for reciprocal sliding movement in the vertical direction and is prevented by these columns from tipping or moving horizontally. Vertical positioning of the tool head support 31 is provided by a motor 32 that is mounted on the overhead plate 30 and is connected by a drive mechanism 33 to the tool head support 31 with this drive mechanism 33 being of any suitable conventional type such as a worm drive that is operable on selective motor operation to effect lifting and lowering of the tool head support 31.

Figure 2:
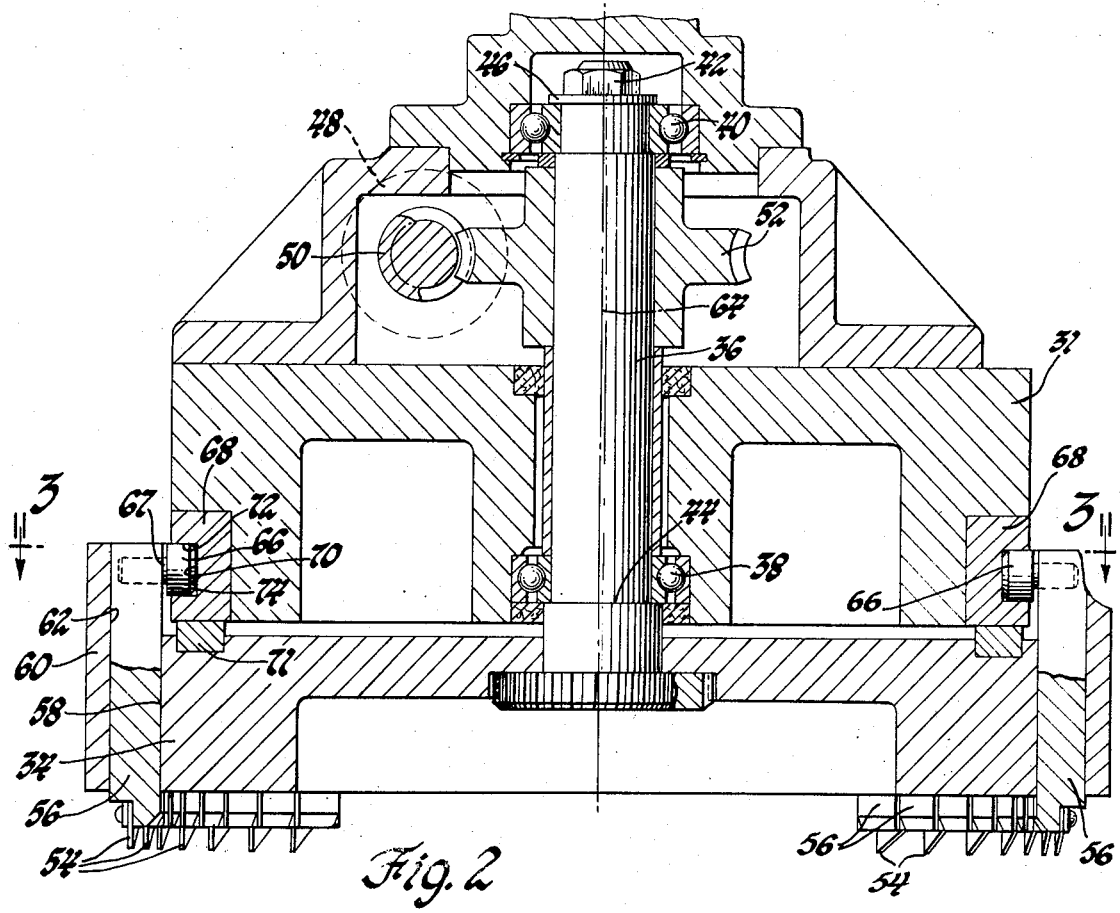
FIG. 2 is an enlarged view taken along line 2—2 in FIG. 1 with parts broken away.

The vertically adjustable tool head support 31 supports a rotary tool head 34 which as best shown in FIG. 2 is splined at its center to the lower end of a spindle 36 that is supported at its opposite ends in the vertically adjustable tool head support 31 by anti-friction bearings 38 and 40. The spindle 36 is maintained in a fixed axial position on the tool head support 31 by a nut 42 which is threaded to the upper end of the spindle 36 to draw a shoulder 44 at the lower spindle end up against the inner race of the lower bearing 38 and a washer 46 at the upper end of the spindle down against the inner race of the upper bearing 40. Power turning of the rotary head 34 is effected by a motor 48 which is mounted on the vertically adjustable tool head support 32 and drives a screw 50 that engages at right angles with a pinion 52 fixed to the rotary tool head spindle 36 intermediate the bearings 38 and 40.

Figure 3:
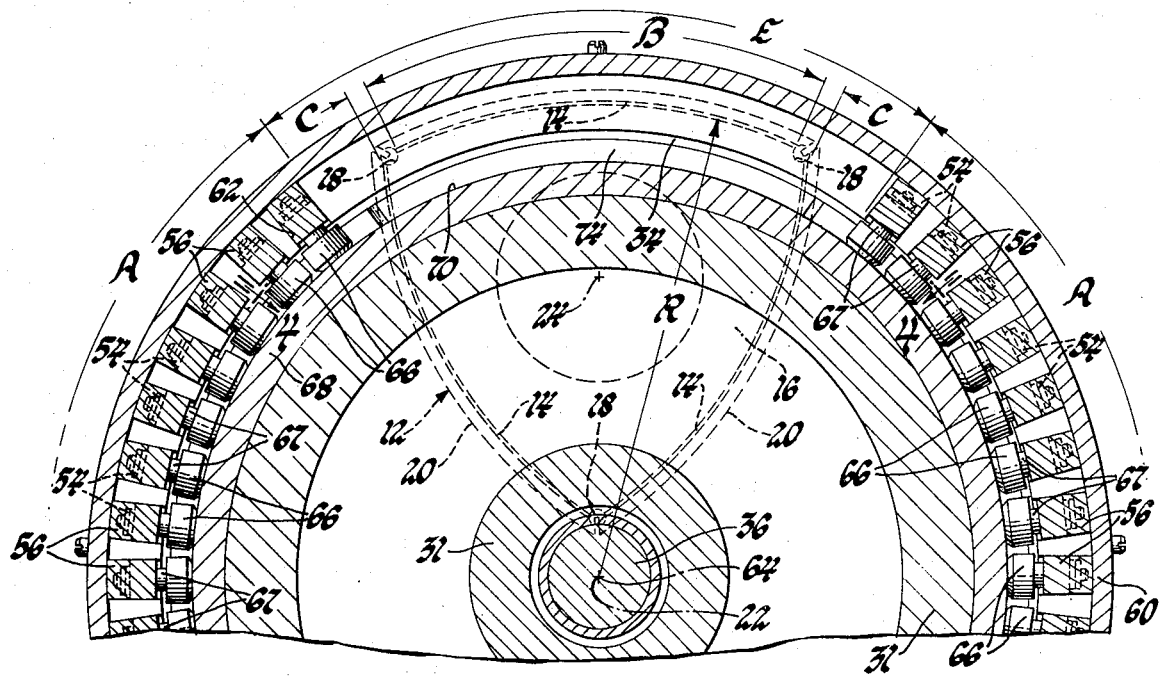
FIG. 3 is a view taken along the line 3—3 in FIG. 2.
Figure 4:
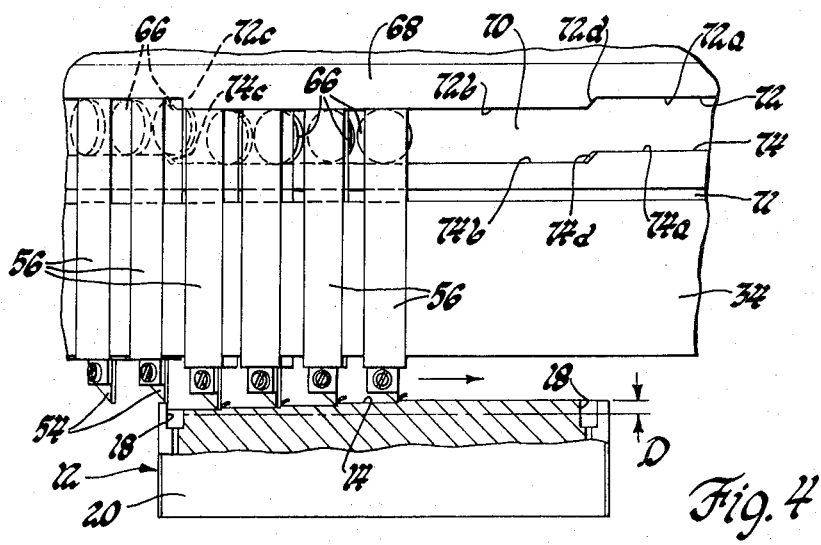
FIG. 4 is a view taken along the line 4—4 in FIG. 3 with parts broken away.

The machine's cutting tool is generally of the broach type comprising a plurality of teeth 54 which instead of being normally integral or fixed with respect to each other are made movable relatively to each other. Each of the teeth 54 is detachably secured to the lower end of a carrier 56 as best shown in FIGS. 2, 3 and 4. The rotary tool head 34 has radially outwardly facing, axially extending grooves 58 that are equally radially spaced from the rotary tool head's center and are closed at their outer radius by a ring 60 to provide carrier guideways 62 that receive with sliding clearance the tooth carriers 56. The carrier guideways 62 locate the teeth 54 to cut in a tangential direction at radii from the rotary tool head's axis 64 equal to the radii $R_S$ and $R_L$ of the groove to be cut in the workpiece and also act to guide movement of the teeth in directions parallel to the rotary tool head axis 64. The carriers 56 and their teeth 54 are contained within a circular arc A about the rotary tool head axis 64 that does not overlap the workpiece as shown in FIG. 3. Vertical or axial positioning of the teeth 54 relative to the rotary tool head 34 is effected by each of the tooth carriers 56 having at its upper end a cam follower in the form of a roller 66 rotatably mounted on a spindle 67 which is secured to the radially inward side of the carrier and positions the roller axis on a radius from the rotary tool head axis 64. A ring shaped cam track 68 is fixed to the lower outside corner of the tool head support 31 with its center on the rotor tool head's axis 64 and has a radially outwardly facing circumferencial extending groove 70 that receives the cam follower rollers 66. A thrust ring 71 mounted on the upper side of tool head 34 runs against the lower side of track 68 to support the tool head against axial loads in this vicinity. The cam track groove 70 has radially projecting oppositely facing walls 72 and 74 which provide cam surfaces that contact the cam follower rollers 66 at diametrically opposite places and operate to position the carriers 56 and thus the cutting teeth 54 in cutting positions throughout a circular arc at least as long as arc B of the groove to be cut and also position the cutting teeth in noncutting positions clear of the workpiece throughout the arc A all within one tool head revolution. Referring to FIGS. 3 and 4, this is accomplished by the cam surfaces having a tooth retracted portion 72a and 74a extending through a circular arc at a first axial location on the rotary tool head longer than the arc A containing the teeth but not overlapping an arc encompassing the side seal groove arc B and the arcs C of the two corner seal apertures at the ends of the seal grooves, this axial location being such that when the tool head 34 is lowered to a cutting position the teeth 54 are maintained in noncutting positions clear of the rotor side 16 outside of the groove to be cut and the apertures at either end as the tool head 34 turns. The cam surfaces further have a tooth extended portion 72b and 74b which extends through a circular arc slightly longer than the arc B of the groove to be cut at a second axial location on the rotary tool head to that side of the tooth retracted axial location toward the workpiece and thus the groove to be cut and spaced from the tooth retracted location a distance equal to the depth D of the groove to be cut plus the smallest clearance between the teeth and workpiece when the teeth are in their retracted positions. Thus, the teeth are maintained in fixed cutting positions from one end of the groove to be cut to the other end as the tool head 34 turns. The teeth 54 are extended from their noncutting positions to their cutting positions by the cam surfaces having a tooth extending portion $72_c$ and $74_c$ between one end of their retracted portions $72_a$ and $74_a$ and one end of their tooth extended portion $72_b$ and $74_b$ with this tooth extending portion extending through a circular arc less than the arc C of the apertures 18 in the workpiece with this tooth extending portion $72_c$ and $74_c$ having a varying axial location between the axial locations of the extended and retracted portions so that they operate to move the teeth from their retracting positions to their cutting positions while they traverse one of the apertures 18 as the tool head 31 turns. Lastly, the cam surfaces have a tooth retracting portion $72_d$ and $74_d$ that extends through a circular arc less than the apertures' arc C between the other end of the tooth extended portion $72_b$ and $74_b$ and the other end of the tooth retracted portion $72_a$ and $74_a$ for moving the teeth 54 from their cutting positions to their noncutting positions while they traverse the other aperture in the workpiece as the tool head 34 turns and after having performed their cutting operations.

The teeth 54 have progressively increasing cutting depth in a direction opposite the direction of rotary tool head turning and reaching a maximum equal to the desired groove depth D with these depths measured parallel to the tool head axis 64 from a fixed axial reference on the tool head when the teeth are in their cutting positions whereby they cut a circular arc groove of constant depth D with the desired width W of the groove obtained by the cutting width of the cutting teeth measured in the radial direction.

Describing now the groove cutting operation provided by the groove cutting machine 10, a rotor workpiece 12 is detachably secured by pins 75 to a workpiece fixture 76 located on the machine's table 26 while the tool head is in a raised position provided by operation of motor 34 to readily permit such workpiece insertion. The fixture 76 locates the rotor workpiece 12 underneath the rotary tool head 34 in a position such that the rotary tool head's axis 64 is coincident with the center line 22 of the side seal groove to be cut in one side 16 of the rotor 12. The vertical tool head adjustment motor 32 is then operated to lower the rotary tool head 34 to its operating position shown in FIG. 1 with the rotary tool head at an angular position such that the circular arc E of the rotary tool head in which there are no teeth overlies the workpiece. Then the rotary tool head drive motor 48 is operated to turn the tool head 34, the teeth 54 turn with the tool head in the direction of the arrow as shown in FIG. 4 and the cam tracks tooth retracted portion $72_a$ and $74_a$ guides the teeth 54 with clearance past the rotor side 16 until the left-hand aperture 18 is reached whereupon the cam track's tooth extending portion $72_c$ and $74_c$ operates to extend the teeth from their noncutting positions to their cutting positions within the arc C of this aperture prior to first engaging the rotor side 16. Thereafter, the teeth 54 are maintained in their cutting positions by the cam track's tooth extended portion $72_b$ and $74_b$ and take progressively deeper cuts in the workpiece as they traverse the groove arc B. Upon reaching the right-hand aperture 18 the cam track's tooth retracting portion $74_b$ and $74_d$ operates to retract the teeth to their noncutting positions with the arc C of this latter aperture so that they thereafter clear the rotor side 16 as they continue to turn with tool head 34. In this way, there is machined a circular arc groove of constant depth equal to the largest cutting depth of the teeth between the two apertures in the workpiece and without these teeth extending the cut beyond these apertures and with the cutting of the groove thus being completed within one complete tool head revolution. After the last tooth clears the workpiece the rotary tool head continues to be turned until its tooth free zone E is brought into position to commence the cutting of another groove. Positioning of the rotor for the cutting of the other grooves in this one side is provided by an indexing mechanism including a motor 78 which is detachably drivingly connected by a drive mechanism 80 to the rotor workpiece. The indexing mechanism operates to index the rotor about its axis 24 on the fixture 76 to two other identical positions to receive identical cutting operations to cut the second and third grooves in this rotor side.

Thus, the groove cutting machine according to the present invention is capable of rapidly and accurately machining a circular arc groove of constant depth between two apertures without overcutting of the workpiece past these apertures. Furthermore, it will be understood that the design of the teeth may be in accordance with conventional broach tooth design recognizing that the groove is cut by only one pass of the teeth.

The above described embodiment is illustrative of the invention which may be modified within the scope of the appended claims.

I claim:

1. A groove cutting machine for cutting a circular arc groove of constant depth extending between two apertures in a workpiece comprising a tool head rotatable about an axis coincident with the center line of the circular arc groove to be cut, a plurality of relatively movable cutting teeth, means on said tool head for locating said teeth to cut in a tangential direction at radii from said axis equal to the radii of the groove to be cut and for guiding movement of said teeth in directions parallel to said axis, said teeth contained within a circular arc about said axis that does not overlap the arc of the groove to be cut between the two apertures in the workpiece, each of said teeth having a cam follower, stationary cam means having a circular cam track centered on said axis, said cam track having axially oppositely facing cam surfaces for engaging said cam followers to positively maintain said cutting teeth in fixed cutting positions throughout a circular arc the length of the groove to be cut and maintain said cutting teeth in retracted positions clear of the workpiece throughout the remaining circular arc between the two apertures in the workpiece in directions parallel to said axis and to extend and retract said cutting teeth between said retracted positions and said cutting positions as they traverse the apertures in the workpiece all within one tool head revolution, and said teeth having a progressively increasing cutting depth in a direction opposite the direction of tool head turning measured parallel to said axis from a fixed reference when said teeth are in their cutting positions whereby a circular arc groove of constant depth equal to the largest cutting depth of said teeth is cut between the two apertures in the workpiece by the teeth being successively extended to their cutting positions as they traverse one of the apertures and thereafter taking progressively deeper cuts in the workpiece and then being retracted to their retracted positions as they traverse the other aperture all within less than one complete tool head revolution.

2. A groove cutting machine for cutting a circular arc groove of constant depth extending between two apertures in a workpiece comprising a tool head rotatable about an axis coincident with the center line of the circular arc groove to be cut, a plurality of relatively movable cutting teeth, means on said tool head for locating said teeth to cut in a tangential direction at radii from said axis equal to the radii of the groove to be cut and for guiding movement of said teeth in directions parallel to said axis, said teeth contained within a circular arc about said axis that does not overlap the arc of the groove to be cut between the two apertures in the workpiece, each of said teeth having a cam follower, stationary cam means having a circular cam track centered on said axis for engaging said cam followers to positively extend said cutting teeth throughout a circular arc the length of the groove to be cut and retract said cutting teeth throughout the remaining circular arc between the two apertures in the workpiece in directions parallel to said axis within one tool head revolution, said cam track having a tooth retracted portion extending through a circular arc at least as long as the remaining arc between the two apertures in the workpiece for maintaining said teeth in retracted positions clear of the workpiece when said teeth are not traversing the circular arc of the groove to be cut as said tool head turns, said cam track further having a tooth extended portion extending through a circular arc at least as long as the arc of the groove to be cut at a fixed axial location for positioning the maintaining said teeth in fixed cutting positions from one end of the groove to be cut to the other end as said tool head turns, said cam track further having a tooth extending portion between one end of said tooth retracted portion and one end of said tooth extended portion extending through a circular arc less than the arc of the apertures in the workpiece at a varying axial location for moving said teeth from their retracted positions to their cutting positions while they traverse one of the apertures as said tool head turns, said cam track further having a tooth retracting portion extending through a circular arc less than the arc of the apertures in the workpiece at a varying axial location for moving said teeth from their cutting positions to their retracted positions while they traverse the other aperture in the workpiece as said tool head turns, and said teeth having a progressively increasing cutting depth in a direction opposite the direction of tool head turning measured parallel to said axis from a fixed reference when said teeth are in their cutting positions whereby a circular arc groove of constant depth equal to the largest cutting depth of said teeth is cut between the two apertures in the workpiece by the teeth being successively extended to their cutting positions as they traverse one of the apertures and thereafter taking progressively deeper cuts in the workpiece and then being retracted to their retracted positions as they traverse the other aperture all within less than one complete tool head revolution.

3. A groove cutting machine for cutting a circular arc groove of constant depth extending between two apertures in a workpiece comprising a tool head rotatable about an axis coincident with the center line of the circular arc groove to be cut, a plurality of relatively movable cutting teeth, means on said tool head for locating said teeth to cut in a tangential direction at radii from said axis equal to the radii of the groove to be cut and for guiding movement of said teeth in directions parallel to said axis, said teeth contained within a circular arc about said axis that does not overlap the arc of the groove to be cut between the two apertures in the workpiece, each of said teeth having a cam follower, stationary cam means having a circular cam track centered on said axis, said cam track having axially oppositely facing cam surfaces for engaging said cam followers to positively extend said cutting teeth throughout a circular arc the length of the groove to be cut and retract said cutting teeth throughout the remaining circular arc between the two apertures in the workpiece in directions parallel to said axis within one tool head revolution, said cam track having a tooth retracted portion extending through a circular arc at a first axial location on said tool head at least as long as the remaining arc between the two apertures in the workpiece for maintaining said teeth in retracted positions clear of the workpiece when said teeth are not traversing the circular arc of the groove to be cut as said tool head turns, said cam track further having a tooth extended portion extending through a circular arc at least as long as the arc of the groove to be cut at a second axial location on said tool head to one side of said first axial location toward the groove to be cut and spaced from said first axial location a distance equal to the depth of the groove to be cut plus the smallest clearance between said teeth and the workpiece when said teeth are in their retracted positions for positioning and maintaining said teeth in fixed cutting positions from one end of the groove to be cut to the other end as said tool head turns, said cam track further having a tooth extending portion between one end of said tooth retracted portion and one end of said tooth extended portion extending through a circular arc less than the arc of the apertures in the workpiece at a varying axial location between said two fixed axial locations for moving said teeth from their retracted positions to their cutting positions while they traverse one of the apertures as said tool head turns, said cam track further having a tooth retracting portion extending through a circular arc less than the arc of the apertures in the workpiece at a varying axial location between said two fixed axial locations for moving said teeth from their cutting positions to their retracted positions while they traverse the other aperture in the workpiece as said tool head turns, and said teeth having a progressively increasing cutting depth in a direction opposite the direction of tool head turning measured parallel to said axis from a fixed reference when said teeth are in their cutting positions whereby a circular arc groove of constant depth equal to the largest cutting depth of said teeth is cut between the two apertures in the workpiece by the teeth being successively extended to their cutting positions as they traverse one of the apertures and thereafter taking progressively deeper cuts in the workpiece and then being retracted to their retracted positions as they traverse the other aperture all within less than one complete tool head revolution.

* * * * *